United States Patent [19]

Zirngibl

[11] Patent Number: 4,785,083

[45] Date of Patent: Nov. 15, 1988

[54] MIXTURES OF 1-N-$C_{3-7}$ALKYL-5-(4'-CHLORO-2'-NITROPHENYLOZO)-3-CYANO-6-HYDROXY-4-METHYLPYRID-2-ONE COMPOUNDS

[75] Inventor: Ulrich Zirngibl, Oberwil, Switzerland

[73] Assignee: Sandoz Ltd., Base, Switzerland

[21] Appl. No.: 453,750

[22] Filed: Dec. 27, 1982

[30] Foreign Application Priority Data

Dec. 28, 1981 [DE]  Fed. Rep. of Germany ....... 3151648

[51] Int. Cl.$^4$ ..................... C09B 29/22; C09B 29/42; C09B 67/22; C09B 67/48
[52] U.S. Cl. ...................... 534/575; 8/639; 534/573; 534/772; 534/582; 534/887
[58] Field of Search ............. 260/156; 534/573, 772, 534/575; 8/639

[56] References Cited

U.S. PATENT DOCUMENTS 3,640,674  2/1972  Berrie et al. ............... 260/156 X
3,905,951  9/1951  Berrie et al. ............... 360/156

FOREIGN PATENT DOCUMENTS 0038439  10/1981  European Pat. Off. .......... 260/156
0083313  7/1983   European Pat. Off. .......... 260/156
2753235  6/1978   Fed. Rep. of Germany ...... 260/156
3012863  10/1981  Fed. Rep. of Germany ...... 260/156
1282384  7/1972   United Kingdom ............. 260/156

OTHER PUBLICATIONS

Biedermann, J. Soc. Dyers Colourists, vol. 87, pp. 105 to 111 (1971).

*Primary Examiner*—Floyd D. Higel
*Attorney, Agent, or Firm*—Gerald D. Sharkin; Richard E. Vila; Melvyn M. Kassenoff

[57] ABSTRACT

Mixtures comprising at least two dyes of formula I

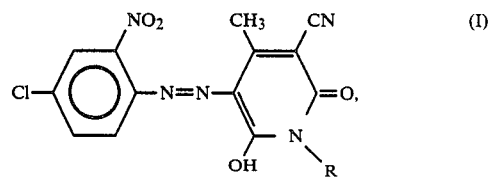

where R is unsubstituted linear $C_{3-7}$alkyl, with the proviso that at least two different dyes of formula I are each present to the extent of at least 10 mole %, based on the total molar quantity of dyes present, which are useful for dyeing and printing synthetic and semi-synthetic high molecular weight, hydrophobic organic substrates, particularly for rapid dyeing.

15 Claims, No Drawings

MIXTURES OF 1-N-C$_{3-7}$ALKYL-5-(4'-CHLORO-2'-NITRO-PHENYLOZO)-3-CYANO-6-HYDROXY-4-METH-LYPYRID-2-ONE COMPOUNDS

The invention relates to mixtures of disperse dyes, primarily for use in high temperature (HT) and rapid dyeing.

According to the invention there are provided mixtures comprising at least two dyestuffs of formula I

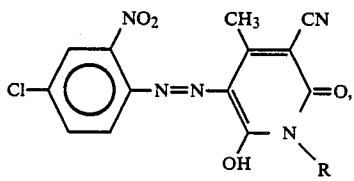

where R is an unsubstituted linear C$_{3-7}$alkyl group, with the proviso that at least two different compounds of formula I are each present to the extent of at least 10 mole %, based on the total molar quantity of dyestuffs present.

Preferably R is n-propyl, n-butyl, n-pentyl or n-hexyl, more preferably n-propyl, n-butyl or n-pentyl.

The mole ratio of a mixture containing two different compounds of formula I is preferably from 1:3 to 3:1, more preferably 1:1. Mixtures containing three different compounds of formula I are also interesting.

Preferred mixtures are those containing at least two dyestuffs of formula I wherein one R is n-propyl and the other is n-butyl or n-pentyl. More preferred mixtures are those containing from 25 to 75 mole % of a compound of formula I where R is n-propyl, and 75 to 25 mole % of a compound of formula I where R is n-butyl, more preferably a mixture containing 50 mole % of a compound of formula I where R is n-propyl and 50 mole % of a compound of formula I where R is n-butyl. For the sake of simplicity, the latter mixture will be referred to in the specification as mixture A.

The present invention further provides a process for the production of the mixtures of compounds of formula I comprising coupling the diazo derivative of 2-nitro-4-chloroaniline with a mixture of compounds of formula II

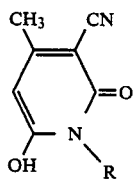

The mixtures of the invention can also be produced by mixing the individual compounds of formula I, e.g. by grinding the components together optionally in the form of a dyeing preparation.

The individual compounds of formulae I and II are known.

The individual compounds of formula I as well as the mixtures of the invention can exist in different solid forms. For example, the preferred mixture A exists in at least four distinct solid forms, the α-, β-, γ- and δ-modifications. Surprisingly, the mixtures of two compounds of formula I, particularly those having the preferred ratio 25 to 75 mole % and 75 to 25 mole %, more particularly the equimolar mixtures, tend to behave like single compounds as far as their crystalline modifications and their dyeing properties are concerned.

Mixture A, when produced directly from diazo coupling in an aqueous hydrochloric acid medium, is obtained in the α-modification.

When mixture A is produced from diazo coupling in a nitrosylsulphuric acid medium, it is obtained in the β-modification. On heating to 90° C. in an aqueous suspension, the β-form is mainly converted into the γ-modification, which may be in admixture with the α-modification.

The γ-modification of mixture A is obtained by heating an aqueous suspension of the α-modification of mixture A at 130° C. under pressure, e.g. in an autoclave, and seeding with γ-crystals.

The δ-modification of mixture A is obtained by recrystallisation of 1 part of the dried α-modification from 100 parts of 1:1 mixture of chlorobenzene and ethanol.

The different crystal modifications of mixture A may be distinguished by their X-ray diffraction spectra. The interplanar spacing (d-values) in Angstrom units of the observed lines in the X-ray diffraction spectrum, as measured by a Guinier/De Wolff camera using CuK$_α$ radiation, are as indicated below. The d-values of the various crystalline modifications hae been assessed for each single component and for mixture A. The intensity of the lines was estimated visually on a 4-step scale: s=strong; m=medium; w=weak; vw=very weak.

A diffuse line is indicated by the letter D.

(i) α-modification of the compound of formula I where R is n-C$_3$H$_7$: d=21.8 w, 10.9 mD, 7.8 vw, 7.3 w, 6.1 vw, 5.8 vw, 5.6 vw, 4.9 mD, 3.7 vw, 3.48 m, 3.41 m, 3.39 m, 3.22 vw, 3.13 vw, 2.95 vw, 2.72 vw Å.

(ii) β-modification of the compound of formula I where R is n-C$_3$H$_7$: d=10.4 w, 8.3 w, 7.6 m, 6.9 m, 6.2 m, 6.0 vw, 5.5 vw, 5.2 vw, 4.84 w, 4.7 m, 4.64 m, 4.5 m, 4.2 w, 3.89 vw, 3.8 vw, 3.55 w, 3.49 w, 3.38 s, 3.29 s, 3.19 vw, 3.14 w, 3.08 w, 2.9 w, 2.85 w, 2.6 wD, 2.53 wD, 2.45 w, 2.4 w, 2.35 vw, 2.23 vw, 2.19 vw, 2.05 vw, 1.93 wD, 1.68 wD, 1.65 wD Å.

(iii) α-modification of the compound of formula I where R is n-C$_4$H$_9$: d=12.2 m, 10.9 m, 8.8 m, 7.4 w, 7.0 m, 5.6 m, 4.95 m, 4.39 vw, 4.18 m, 4.10 m, 3.85 vw, 3.65 m, 3.5 w, 3.44 m, 3.21 m, 2.99 vw, 2.85 vw, 2.75 w, 2.4 vw Å.

(iv) mixture A:
α-modification: d=13.0 s, 9.1 m, 8.2 m, 6.5 w, 4.95 m, 4.5 w, 4.45 vw, 4.3 w, 4.09 m, 3.93 w, 3.71 w, 3.69 m, 3.59 m, 3.41 vw, 3.36 m, 3.34 m, 3.26 m, 3.05 w, 2.97 wD, 2.75 vw, 2.6 vwD, 2.5 vwD Å.
β-modification: d=11.8 m, 11.2 m, 9.7 m, 6.6 m, 6.4 w, 5.2 m, 4.5 vw, 4.3 vw, 3.9 vw, 3.4 s, 3.28 w, 2.92 vw, 2.6 vw Å.
γ-modification: d=12.0 m, 10.4 m, 8.5 vw, 7.4 vw, 7.0 m, 5.6 m, 5.22 vw, 4.95 m, 4.65 vw, 4.25 vw, 4.1 m, 4.02 vw, 3.95 vw, 3.81 vw, 3.7 vw, 3.59 m, 3.5 vw, 3.4 m, 3.15 m, 2.95 vw, 2.85 vw, 2.7 vw, 2.26 vw, 1.87 vw Å.

It can be seen from the X-ray diffraction spectra that the mixtures A behave like a single compound, the spectrum of the α-modification being completely distinct from that of each single α-compound.

The mixtures of the invention are useful for dyeing and printing synthetic and semi-synthetic high molecular weight, hydrophobic organic substrates from aqueous suspension. The preferred substrates are those consisting of or comprising linear, aromatic polyesters, cellulose 2½ acetate, cellulose triacetate and synthetic polyamides. The substrate may be in loose fibre, yarn or fabric form. For dyeing, the mixtures may be made up into dyeing preparations in accordance with known methods, e.g. grinding in the presence of dispersing agents or extenders. The dyeing preparations may be dried, e.g. in vacuo or by spray-drying. They contain the dyestuff particles in a very fine, stable distribution, their average diameter being around 1μ.

Dyeing and printing may be carried out in accordance with known methods from a short or long liquor to goods ratio, e.g. as described in French Pat. No. 1,445,371. However, the α- and β-modifications, particularly the α-modification of mixture A, while used for dyeing at high temperatures, e.g. temperatures of up to 130° C., tend to change over to the γ-modification, which leads to the formation of large undispersed, quickly setting crystals, and thus are not suitable for making dyeings in which it is necessary that the dispersion remains fine and stable, for example cross-wound bobbin dyeing in deep shades; for such uses the α-modification of the mixture should be converted to the γ-modification before grinding. The δ-modification of mixture A is less advantageous since its production involves more time and work and the use of organic solvents.

The mixtures of the invention, especially the γ-modification of mixture A, have good resistance to hydrolysis and good build-up power on the above-mentioned substrates and give reproducible dyeings having excellent fastnesses, in particular light and sublimation fastnesses.

In comparison with the individual dyes of formula I, the mixtures of the invention, especially the γ-modification of mixture A, are particularly suitable for HT-dyeing, more particularly for rapid dyeing. By "rapid dyeing" is meant a dyeing process carried out at a temperature above 100° C. in a significantly shorter time, for example 20 minutes, than in a conventional polyester HT-dyeing process (1 hour). The mixtures of the invention are particularly useful for rapid dyeing; they have a ≧95%-degree of exhaustion from the dyebath onto polyester when dyed at 130° C. for at most 20 minutes. The reductive afterclearing of the dyeings achieved with the mixtures of the invention is no longer necessary. Furthermore, the levelness of the dyeings is excellent.

The γ-modification of mixture A is particularly preferred.

The following Examples further serve to illustrate the invention. In the Examples all parts are by weight and the temperatures are in degrees Centigrade.

EXAMPLE 1

(a) 7.0 parts 4-chloro-2-nitroaniline are dissolved in 50 parts acetic acid at 70° and, after the addition of 13.8 parts concentrated hydrochloric acid and 50 parts ice, the resulting mixture is diazotized by adding 10.0 parts of a 4N sodium nitrite solution over 15 minutes at 0°–5°. The resulting mixture is stirred for 30 minutes and thereafter the excess nitrous acid is destroyed with a small amount of aminosulphonic acid. The mixture is then filtered to remove the small amounts of impurities which are present.

The resulting diazo solution is introduced at 0°–5° over 1 hour to a solution of 7.9 parts 1-n-alkyl-3-cyano-4-methyl-6-hydroxypyridone (alkyl=50% n-propyl+50% n-butyl) in 100 parts water, while maintaining the pH between 3 and 6 by adding a solution of sodium hydroxide. The dye formed precipitates immediately in the form of deep yellow flakes. Stirring is continued for 4 hours while the temperature is allowed to rise to room temperature. The resulting dye is filtered and washed with water until salt free. M.p. of the mixture: 181°–183°.

(b) 1 part of the moist mixture obtained above in the α-modification is added to five parts water and after addition of a few γ-crystals as seeds and about 1 part sodium di-naphthylmethanedisulphonate, acid salt, the mixture is heated for 1 hour at 130° in an autoclave and then cooled and filtered.

(c) 4.0 parts of the dye mixture obtained in (b) in the form of a moist paste containing 16 parts water, and 6.0 parts of a commercially available dispersing agent, e.g. sodium ligninsulphonate, are ground as an aqueous suspension in a ball mill to finely divided particles having an average size of about 1μ. After removal of the glass beads, the resulting dispersion is adjusted to pH 7.8.

The dispersion can be used directly as such or after spraydrying.

APPLICATION EXAMPLE

10 Parts texturized polyester yarn are introduced at 70° in 200 parts of a dyebath containing 0.1 part of the dried dyeing preparation as obtained in Example 1(c) and adjusted to pH 5 with a buffer solution of formic acid and ammonium sulphate. The autoclave is closed and heated over 30 minutes to 130°, the dyebath is cooled and the yarn is taken out, rinsed, soaped, rinsed again and dried.

A yellow dyed yarn is obtained with an excellent levelness and a dyeing depth corresponding to 3×1/1 standard dyeing depth. The dyebath is exhausted to 99% although the yarn has been dyed for only 20 minutes.

Further examples of dye mixtures according to the invention are indicated in the following Table. They are prepared as described in Example 1 and may be used according to the Application Example. Yellow dyeings with excellent fastnesses are obtained on a polyester substrate.

TABLE

| EX. No. | R = | | |
|---|---|---|---|
| 2 | 30% n-Propyl, | 70% n-Butyl | — |
| 3 | 75% n-Propyl, | 25% n-Butyl | — |
| 4 | 40% n-Propyl, | 30% n-Butyl, | 30% n-Hexyl |
| 5 | 25% n-Propyl, | 50% n-Butyl, | 25% n-Heptyl |
| 6 | 60% n-Pentyl, | 40% n-Butyl | — |
| 7 | 50% n-Hexyl, | 50% n-Butyl | — |
| 8 | 40% n-Heptyl, | 60% n-Butyl | — |
| 9 | 25% n-Hexyl, | 50% n-Butyl, | 25% n-Pentyl |
| 10 | 40% n-Hexyl, | 40% n-Butyl, | 20% n-Heptyl |
| 11 | 40% n-Propyl, | 60% n-Heptyl | — |
| 12 | 50% n-Propyl, | 50% n-Hexyl | — |
| 13 | 30% n-Propyl, | 40% n-Butyl, | 30% n-Pentyl |
| 14 | 50% n-Propyl, | 50% n-Pentyl | — |
| 15 | 40% n-Propyl, | 40% n-Pentyl, | 20% n-Hexyl |
| 16 | 15% n-Propyl, | 60% n-Heptyl, | 25% n-Hexyl |
| 17 | 20% n-Propyl, | 20% n-Butyl, | 60% n-Hexyl |
| 18 | 50% n-Pentyl, | 50% n-Hexyl | — |
| 19 | 60% n-Pentyl, | 40% n-Heptyl | — |
| 20 | 30% n-Propyl, | 40% n-Heptyl, | 30% n-Pentyl |
| 21 | 50% n-Hexyl, | 20% n-Heptyl, | 30% n-Pentyl |
| 22 | 60% n-Butyl, | 20% n-Heptyl, | 20% n-Pentyl |

Examples 2 and 3 are mixtures of the compound of Formula I wherein R is n-propyl and the compound of Formula I wherein R is n-butyl wherein the mole ratio of the former to the latter is 1:2.33 (Example 2) or 3:1 (Example 3).

What is claimed is:

1. A mixture comprising at least two dyes of the formula

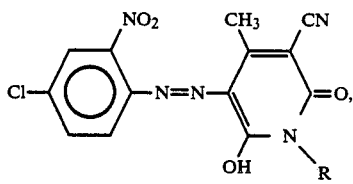

wherein R is unsubstituted $n$-$C_{3-7}$alkyl, with the proviso that at least two different dyes of said formula are present to the extent of at least 10 mole % each, based upon the total molar quantity of dyes present.

2. A mixture according to claim 1 consisting essentially of at least two dyes of the formula

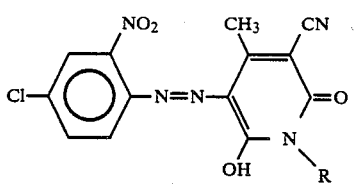

each of which is present to the extent of at least 10 mole %.

3. A mixture according to claim 2 consisting essentially of two dyes of the formula

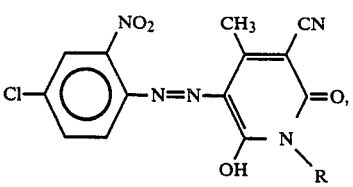

the mole ratio of one to the other being 9:1 to 1:9.

4. A mixture according to claim 3 wherein the mole ratio of one dye to the other is 3:1 to 1:3.

5. A mixture according to claim 4 wherein the mole ratio is 1:1.

6. A mixture according to claim 5 consisting essentially of 50 mole % of the dye of the formula

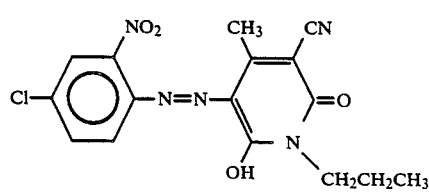

and 50 mole % of the dye of the formula

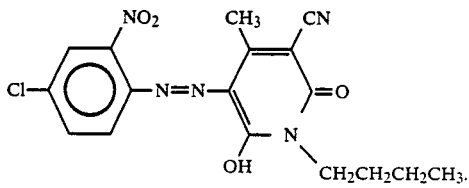

7. A mixture according to claim 1 containing two dyes of the formula

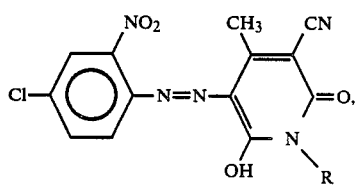

the mole ratio of one to the other being 3:1 to 1:3.

8. A mixture according to claim 7 wherein the mole ratio is 1:1.

9. A mixture according to claim 3 consisting essentially of the dye of the formula

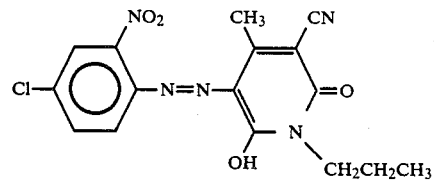

and the dye of the formula

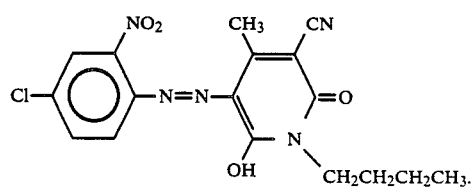

10. A mixture according to claim 4 consisting essentially of the dye of the formula

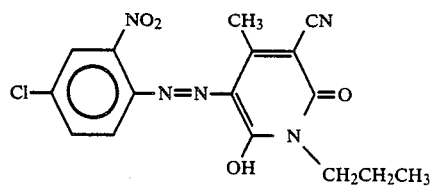

and the dye of the formula

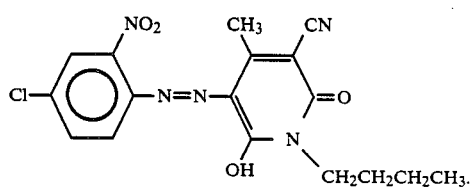

11. A mixture according to claim 10 wherein the molar ratio of the former to the latter is 1:2.33.

12. A mixture according to claim 10 wherein the molar ratio of the former to the latter is 3:1.

13. The γ-modification of the mixture according to claim 6, said γ-modification having an X-ray diffraction spectrum (CuK$_\alpha$ radiation) exhibiting lines at d-values of 12.0 (medium), 10.4 (medium), 8.5 (very weak), 7.4 (very weak), 7.0 (medium), 5.6 (medium), 5.22 (very weak), 4.95 (medium), 4.65 (very weak), 4.25 (very weak), 4.1 (medium), 4.02 (very weak), 3.95 (very weak), 3.81 (very weak), 3.7 (very weak), 3.59 (medium), 3.5 (very weak), 3.4 (medium), 3.15 (medium), 2.95 (very weak), 2.85 (very weak), 2.7 (very weak), 2.26 (very weak) and 1.87 (very weak) Å.

14. The α-modification of the mixture according to claim 6, said α-modification having an X-ray diffraction spectrum (CuK$_\alpha$ radiation) exhibiting lines at d-values of 13.0 (strong), 9.1 (medium), 8.2 (medium), 6.5 (weak), 4.95 (medium), 4.5 (weak), 4.45 (very weak), 4.3 (weak), 4.09 (medium), 3.93 (weak), 3.71 (weak), 3.69 (medium), 3.59 (medium), 3.41 (very weak), 3.36 (medium), 3.34 (medium), 3.26 (medium), 3.05 (weak), 2.97 (weak diffuse), 2.75 (very weak), 2.6 (very weak diffuse) and 2.5 (very weak diffuse) Å.

15. The β-modification of the mixture according to claim 6, said β-modification having an X-ray diffraction spectrum (CuK$_\alpha$ radiation) exhibiting lines at d-values of 11.8 (medium), 11.2 (medium), 9.7 (medium), 6.6 (medium), 6.4 (weak), 5.2 (medium), 4.5 (very weak), 4.3 (very weak), 3.9 (very weak), 3.4 (strong), 3.28 (weak), 2.92 (very weak) and 2.6 (very weak) Å.

* * * * *